Patented Oct. 18, 1927.

1,646,128

UNITED STATES PATENT OFFICE.

ROBERT H. VAN SCHAACK, JR., OF EVANSTON, ILLINOIS.

ESTERS OF NORMAL-AMYL ALCOHOL.

No Drawing.    Application filed April 19, 1926.    Serial No. 103,152.

My invention relates to new and useful esters of straight chain amyl alcohol, and particularly to the esters formed by it with phthalic acid.

The phthalic ester of isoamyl alcohol is already well known. That the corresponding ester of straight chain amyl-alcohol or of other higher straight chain alcohols has not been discovered heretofore, is attributable to the rarity, up to this time, of straight chain amyl alcohol, straight chain hexyl alcohol, etc. For example, the amyl alcohol produced during the usual fermentation of carbohydrates is isoamyl. Only now has normal-amyl alcohol assumed commercial importance, because of recent progress with its synthesis from normal pentane. Normal-hexyl alcohol is of importance also because of its production in a similar manner from hexane.

It is not necessary to point out the distinction in chemical and physical properties between the various amyl alcohols, other than to list them and classify them as hydroxyl derivatives either of straight chain or normal pentane or of a branched chain or isopentane. This tabulation is given in Table I.

Table I.—Amylalcohols.

| Formula. | Class. | B. p. °C. |
|---|---|---|
| (CH$_3$)$_2$.CH.CH$_2$.CH$_2$.OH | Branched-chain | 131.4 |
| (CH$_3$)$_2$.CH.CH(OH).CH$_3$ | Branched-chain | 112.5 |
| (CH$_3$)$_3$.C(OH).C$_2$H$_5$ | Branched-chain | 102.5 |
| (CH$_3$)$_3$.C.CH$_2$.OH | Branched-chain | 112.0 |
| CH$_3$.CH.(C$_2$H$_5$).CH$_2$.OH | Branched-chain | 128.7 |
| CH$_3$.(CH$_2$)$_3$.CH$_2$OH | Straight chain | 137.0 |
| CH$_3$.(CH$_2$)$_2$.CH(OH).CH$_3$ | Straight chain | 118.5 |
| C$_2$H$_5$.CH(OH).C$_2$H$_5$ | Straight chain | 116.5 |

The variation in boiling points and in stability of the various amyl alcohols is greater than between butyl alcohol and the isoamyl alcohol which has been the commercial variety of amyl alcohol up to this time. The differences in the chemical, structural, and physical properties of the various amyl radicals give more or less closely corresponding differences also in the esters made from those alcohols and phthalic acid.

Such esters of the straight chain amyl alcohols may have the hydrogen atoms of both the carboxyl groups of phthalic acid replaced by the amyl radical. Or, one of those hydrogen atoms may remain, as to give mono-straight chain amyl phthalate. Or, this hydrogen may be replaced by some other hydrocarbon radical to give esters of the type ethyl normal-amyl phthalate.

The method of preparing the phthalic esters containing the straight chain pentyl or amyl radical is disclaimed, as no part of my invention.

One skilled in the art may readily make them, by boiling, under a return condenser, phthalic anhydride with the straight chain pentyl alcohol whose radical it is desired to combine with the phthalic anhydride. The reaction may be accelerated by the use of 2 cc. of concentrated sulfuric acid for each 100 cc. of alcohol used. The boiling may be continued for eight hours, and the acidity removed by repeated washing with dilute soda or caustic soda solution and finally with water, before the vacuum distillation of the ester. To make the ester containing some other hydrocarbon radical, in addition to the normal-amyl, a mixture of the two alcohols may well be used. Thus to make ethyl normal-amyl phthalate, I preferably use one molecular weight each of normal-amyl alcohol and of ethyl alcohol for every 0.95 molecular weight of phthalic anhydride. The slight excess of the alcohols above the amount required theoretically to esterify the acid, I have found to be desirable in making more easy the obtaining of a nearly neutral product after washing with the alkalies.

The straight chain pentyl phthalate esters are solvents for pyroxylin of all degrees of nitration, down to 10% nitrogen. Pyroxylin containing appreciably less than 10% of nitrogen contains also poorly nitrated fibres which do not completely dissolve in these phthalates. These esters, as made, are yellowish-brown to almost water-white, the esters if completely purified being presumably colorless. The esters decompose if boiled at atmospheric temperature, much phthalic anhydride being formed. If distilled at all, they must be distilled in vacuo, as at 15 mm. of mercury absolute pressure. The esters may be identified by hydrolysis with alkali solutions, distilling the resulting alcohol or alcohols, and then noting the boiling points and specific gravity of the carefully rectified distillate or of each of the fractions obtained from it. Thus di-normal-primary-amyl phthalate (dipentanol 1-phthalate) having the composition represented by the formula

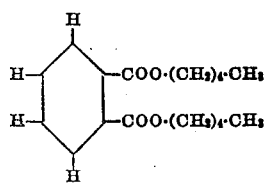

gives, on hydrolysis, normal-primary-amyl alcohol, boiling at 137° C. at 760 mm. of mercury pressure and weighing 81.7 g. per 100 cc. at 0° C. The soldium phthalate, which is the other product of the hydrolysis, may be identified by conversion to phthalic anhydride which can then be sublimed to give needle-like crystals, having a vapor pressure of 760 mm. at 285° C. and melting at 128° C.

For the phthalic acid or anhydride I may substitute other aromatic acids or anhydrides. Thus, I may make the normal-amyl benzoates or salicylates. Also, I may substitute for the normal-primary-amyl alcohol another straight chain pentyl alcohol, either $$CH_3.CH_2.CH_2.CHOH.CH_3$$

or $C_2H_5.CH(OH).C_2H_5$ or a straight chain aliphatic alcohol containing 6 to 8 carbon atoms of the molecule, the alcohol group being in the primary or any other position. I may also use an aromatic alcohol to replace a part of the normal-amyl alcohol, as to give benzyl normal-amyl phthalate.

I disclaim, as no part of my invention, those mixed esters of phthalic acid with two alcohols of which one is normal-butyl alcohol. I disclaim, for example, normal-butyl amyl phthalate.

I claim:

1. As a composition of matter, an ester of phthalic acid whose molecular structure is expressed by the type formula

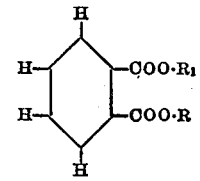

in which $R_1$ represents a straight chain pentyl radical and R any univalent hydrocarbon radical other than normal-butyl.

2. A composition of matter of the type described in claim 1 in which R represents a univalent alkyl radical other than normal-butyl.

3. A composition of matter of the type described in claim 1, in which $R_1$ represents the normal-primary-amyl radical, $$CH_3.CH_2.CH_2.CH_2.CH_2.$$

4. Di-normal pentyl phthalate.

5. Di-normal-primary-amyl phthalate.

6. An ester of normal-amyl alcohol with an aromatic acid.

7. An ester of normal-amyl alcohol with a dicarboxylic aromatic acid.

8. As a composition of matter, an ester of phthalic acid with a normal-alcohol containing 5 to 8 carbon atoms to the molecule of said alcohol.

9. As a composition of matter, an ester of an aromatic acid with a normal-alcohol containing 5 to 8 carbon atoms to the molecule.

10. Di-normal pentyl ortho-phthlate.

In testimony that he claims the foregoing as his own, and has hereto affixed his signature.

ROBERT H. VAN SCHAACK, Jr.